Patented May 2, 1950

2,505,865

UNITED STATES PATENT OFFICE 2,505,865

PREPARATION OF RESINOUS MATERIALS

Ernest D. Lee, Teaneck, and Rupert J. Schefbauer, Jr., Union City, N. J., assignors to Interchemical Corporation, New York, N. Y., a corporation of Ohio No Drawing. Application May 8, 1947, Serial No. 746,857

4 Claims. (Cl. 260—107)

This invention relates to the purification of the crude resin obtained from resin-bearing coals such as are found in Utah, and particularly to obtaining a useful product of relatively high melting point from the crude resin.

Certain coals, notably the bituminous coal in the Utah coal field obtained from between Castlegate on the north and Salina Canyon on the south, contain substantial percentages (up to 10%) of resinous material, which has heretofore not been utilized because of the difficulty in separating it from the coal. It has been proposed to effect such a separation by froth flotation (U. S. Patent No. 1,773,997), but the product obtained is a very dirty material, being contaminated with a considerable percentage (15 to 20%) of coal. Attempts to separate the coal by dissolving the resin away from it have not proven successful, because the solutions tend to clog the filters badly. Attempts have likewise been made to dissolve the resin directly out of coal with solvents, but such methods are far too costly, because of the fact that large quantities of solvent are retained by the coal, so that the cost of recovery is excessive.

It has now been discovered that a very useful resin can be obtained from the crude resin concentrate obtained by separating the bulk of the coal from the resin by a flotation process. Essentially the process of the invention involves isolating the soluble resin from the crude resin concentrate in the form of a concentrated solution, (e. g. 25 to 45 per cent by weight) in isohexane (2-methyl pentane) then diluting the concentrated solution to about 10 per cent concentration with isohexane and recovering the precipitated amber-colored resin.

The manner in which the invention is practiced can be varied considerably in its details to suit the particular circumstances. For example, if a hexane-soluble resin, i. e. the resin which is soluble in a saturated petroleum hydrocarbon solvent consisting essentially of hexanes of which not more than 25% are cyclic hydrocarbons (e. g. petroleum ether), has been isolated in dry form by evaporation of the clear filtered hexane solution, this dry resin can be redissolved in isohexane solvent to give the solution of desired concentration and then the resin which precipitates on dilution of this solution can be recovered by filtration. If desired, lighter colored resin can be obtained by filtering the resin solution through fuller's earth, or activated heat treated clay; a satisfactory method is disclosed in E. D. Lee United States Patent 2,409,216, issued October 15, 1946.

Also it is obvious that instead of using a solvent such as a petroleum ether consisting largely of hexanes we may use a much purer solvent such as neohexane or isohexane (2-methyl pentane). The use of these purer solvents, especially isohexane, to extract the soluble resin from the crude resin concentrates, obviates the necessity of first isolating the soluble resin in dry form, however, the yield of resin on dilution of isohexane solution is not as great as where the hexane soluble resin has first been isolated in dry form and then redissolved. The resin obtained by redissolving the hexane extracted resin and diluting the same, or the resin obtained by extracting soluble resin from the crude resin concentrate with isohexane followed by dilution with isohexane, is of high melting point (240–260° C.). These high melting resins have good solvent release and are especially useful in the formulation of rapid drying inks.

Starting with a resin concentrate obtained by froth flotation of coal, and containing about 17% of coal and 83% of resin, we may treat 40 pounds of the concentrate with 60 pounds of petroleum ether (60–68° C. boiling range) consisting substantially of hexanes. The product is filtered through an ordinary filter to obtain a filtrate solution containing 30–35% by weight of resin. Evaporation of solvent leaves slightly over 30 pounds of amber-colored resin. When this resin is redissolved in 2-methyl pentane to form a 35% solution and precipitated by dilution to 10%, the precipitated amber-colored resin obtained by filtration amounts to about 6 pounds and has a melting point of 240–260° C. as measured by the Fisher Johns method (Eimer & Amend Catalog 90—page 619). The melting point of the hexane-soluble resin which was redissolved was of the order of 190° C.

Starting with a crude resin concentrate containing 95% resin, the soluble resin was dissolved in a commercial hexane, derived from a low naphthenic base petroleum, to form a 25% solution of resin. After filtration and evaporation of solvent from the filtrate, 82% of the resin, having a melting point of 160–164° C., was recovered. This resin was then redissolved in isohexane to 35% concentration and then diluted to 10% concentration. The amber-colored resin which precipitated was separated by filtration and amounted to about 12% of the total resin present in the crude resin concentrate. It had a melting point of 240 to 260° C.

When the crude resin concentrate is extracted with sufficient isohexane to give approximately a 40% solution of resin in isohexane and this solution is diluted to 10% concentration with isohexane, the yield of precipitated high melting resin is about 14% based on the total amount of resin in the crude concentrate. Similarly, a 30% isohexane extract gives a yield of about 8% of resin.

The high melting resins, obtained by diluting concentrated solutions of soluble coal resin in isohexane according to our invention, can not be redissolved in isohexane. They can be dissolved, however, in the higher boiling petroleum hydrocarbon solvents used in formulating rapid heat drying inks. The property of insolubility in isohexane and the lower petroleum hydrocarbons, except in the presence of the lower melting resins of the crude coal resin concentrate indicates that the high melting resin fraction obtained according to our invention are of higher molecular weight than the lower melting soluble resins.

The ratio of solvent to crude resin concentrate, in the extraction process, can be varied over a wide range. The lower limit for economical working is about 15%, while resin concentration above 45% gives rather viscous solutions which are rather difficult to filter, and resin solutions above 40% concentration are rather difficult to handle in a decolorizing process involving filtering thru fuller's earth or activated heat-treated clay.

As already mentioned the high melting resins obtained by the process of our invention are useful in the formulation of varnish vehicles for use in fast drying inks of the type which are essentially dispersions of pigments in solutions of the resin in petroleum hydrocarbons. The inks are substantially non-drying at room temperatures, but dry rapidly at 150° C. Inks of this type are particularly described in our copending application, Serial No. 746,858, filed May 8, 1947.

We claim:

1. In a method of recovering a resin from a resin-bearing coal of the Utah type wherein the crude resin is separated from the bulk of the coal to produce a resin concentrate of resin admixed with coal, the steps which comprise, separating the soluble resin content of the concentrate in the form of a clear isohexane solution containing 25–45 per cent of resin, diluting the clear resin solution to about 10% concentration with isohexane, and recovering the precipitated resin.

2. In a method of recovering a resin from a resin-bearing coal of the Utah type wherein the crude resin is separated from the bulk of the coal to produce a resin concentrate of resin admixed with coal, the steps which comprise, separating the soluble resin content of the coal in the form of a clear isohexane solution containing 25 to 45 per cent of resin, treating the clear solution with a decolorizing agent, removing the decolorizing agent, diluting the clear resin solution to about 10% concentration with isohexane, and recovering the precipitated resin.

3. In a method of recovering a resin from a resin-bearing coal of the Utah type wherein the crude resin is separated from the bulk of the coal to produce a resin concentrate of resin admixed with coal, the steps which comprise dissolving the resin content in a hydrocarbon solvent to form a 25 to 45 per cent solution, separating the insoluble matter, evaporating the solvent to obtain a dry resin, redissolving the dry resin in isohexane to obtain a 25 to 45% solution, diluting the clear resin solution to about 10% concentration with a hexane solvent, and recovering the precipitated resin.

4. In a method of recovering a resin from a resin-bearing coal of the Utah type wherein the crude resin is separated from the bulk of the coal to produce a resin concentrate of resin admixed with coal, the steps which comprise dissolving the resin content in a hydrocarbon solvent to form a 25 to 45 per cent solution, separating the insoluble matter, treating the coal-free solution with a decolorizing agent, removing the decolorizing agent, evaporating the solvent to obtain a dry resin, redissolving the dry resin in isohexane to obtain a 25 to 45% solution, diluting the clear resin solution to about 10% concentration with a hexane solvent, and recovering the precipitated resin.

ERNEST D. LEE.
RUPERT J. SCHEFBAUER, Jr.

REFERENCES CITED

The following references are of record in the file of this patent:

UNITED STATES PATENTS

| Number | Name | Date |
| --- | --- | --- |
| 2,364,090 | Nagelvoort | Dec. 5, 1944 |